United States Patent [19]

Allert et al.

[11] 4,176,562

[45] Dec. 4, 1979

[54] ANTI-SKID PROTECTIVE CAP ESPECIALLY OF RUBBER, FOR ACTUATING PEDALS OF A MOTOR VEHICLE

[75] Inventors: Anton Allert, Stuttgart; Friedrich Weiss, Neuhausen; Peter Schrape, Stuttgart, all of Fed. Rep. of Germany

[73] Assignee: Daimler-Benz Aktiengesellschaft, Fed. Rep. of Germany

[21] Appl. No.: 759,174

[22] Filed: Jan. 13, 1977

[30] Foreign Application Priority Data

Jan. 29, 1976 [DE] Fed. Rep. of Germany ....... 2603227

[51] Int. Cl.2 ........................ G05G 1/16; C08L 15/02; C08C 19/12

[52] U.S. Cl. .................................... 74/563; 180/90.6; 36/62; 260/735; 260/771; D12/125

[58] Field of Search .......................... 192/0.098, 0.096; 74/478.5, 478, 512, 513, 514, 560, 561, 562, 562.5, 563, 474, 877, 879; D12/125, 174; 180/77 R, 90.6; 36/62; 260/735, 771, 782; 156/308

[56] References Cited

U.S. PATENT DOCUMENTS

| | | | |
|---|---|---|---|
| D. 193,839 | 10/1962 | Zimmerli | D12/174 |
| 1,442,218 | 1/1923 | Hopkinson | 260/735 |
| 1,503,773 | 8/1924 | Stanwood | 74/563 X |
| 1,784,781 | 12/1930 | Bronson | 74/563 X |
| 1,858,809 | 5/1932 | Woller | 74/563 |
| 1,875,399 | 9/1932 | Woller | 74/563 |
| 1,918,918 | 7/1933 | Lambert | 74/563 |
| 1,918,919 | 7/1933 | Lambert | 74/563 |
| 1,981,148 | 11/1934 | Muench | 180/77 R X |
| 2,332,064 | 10/1943 | Duffy | 74/526 |
| 2,333,280 | 11/1943 | Tucker | 260/735 |
| 2,376,027 | 5/1945 | Bouchard | 260/771 X |
| 2,584,831 | 2/1952 | Bashara | 74/563 |
| 2,584,883 | 2/1952 | Karsch | 180/90.6 |
| 2,637,751 | 5/1953 | Brooks | 260/735 X |
| 2,726,453 | 12/1955 | Barrett | 74/526 X |
| 2,732,729 | 1/1956 | Joyce | 74/526 |
| 2,736,758 | 2/1956 | Amerongen et al. | 260/735 X |
| 2,803,971 | 8/1957 | Turner | 74/478.5 X |
| 2,809,538 | 10/1957 | Caldwell | 74/563 |
| 2,986,763 | 6/1961 | Williams | 74/563 X |

FOREIGN PATENT DOCUMENTS

| | | | |
|---|---|---|---|
| 655640 | 1/1963 | Canada | 156/308 |
| 413756 | 5/1925 | Fed. Rep. of Germany | 74/563 |
| 2603651 | 2/1976 | Fed. Rep. of Germany | 74/513 |
| 608089 | 9/1948 | United Kingdom | 74/563 |

OTHER PUBLICATIONS

*Ageing and Weathering of Rubber*, J. M. Buist, 1956, pp. 2, 3, 18, 19, 71–73, 89 and 90.

*Thorp's Dictionary of Applied Chemistry*, Fourth Edition, vol. IV, (p. 20), vol. X (pp. 869–871).

Journal of Applied Polymer Science, vol. II, No. 11, Nov. 1967, pp. 2201–2213.

*Materials & Compounding Ingredients for Rubber*, Bill Communications, Inc., 1975, p. 323.

*The Ageing and Stabilization of Polymers, A. S. Kuzminskii, Library Call No. TP 1140 K8.*

*Ageing and Weathering of Rubber*, J. Buist.

*Primary Examiner*—Samuel Scott
*Assistant Examiner*—Don E. Ferrell
*Attorney, Agent, or Firm*—Craig and Antonelli

[57] ABSTRACT

An anti-skid protective cap for actuating pedals, such as brake pedals and the like, of a motor vehicle with a single downwardly projecting deflecting surface constructed so as to provide good sliding characteristics. This deflecting surface accomodates the sliding of the operator's shoe sole edge therealong during a pedal change. The deflecting surface is provided on the side of the protective cap facing a gas pedal, whereby the operator's shoe is prevented from getting stuck under the actuating pedal. The shoe-engaging portion of the cap may be artificially aged by applying a coating of an aqueous solution of sodium hypochlorite, or it may be provided with a coating of an elastic lacquer.

19 Claims, 3 Drawing Figures

ANTI-SKID PROTECTIVE CAP ESPECIALLY OF RUBBER, FOR ACTUATING PEDALS OF A MOTOR VEHICLE

The present invention relates to anti-skid protective caps, especially of rubber, for actuating pedals of a motor vehicle with a downwardly projecting deflecting tab or flap constructed smooth at its surface.

The actuating pedals for motor vehicles have generally flat foot plates which for purposes of improved adherence of the shoe sole of the driver are provided with a rubber cover and whose surfaces are provided with grooves or with an otherwise structured relief for purposes of increasing the frictional contact.

Critical driving situations require the actuation of one or several actuating pedals in fractions of a second. The driver's foot acting, for example, on the gas pedal is rapidly guided upwardly in order to be able to actuate the brake pedal and may thereby easily get stuck with the edge of the shoe sole under the lateral projection of the brake pedal foot board or foot plate. A delay in the actuation of the brake pedal results therefrom which may be decisive whether the vehicle can still be stopped or not in time ahead of an obstacle.

Actuating pedals are known in the art whose pedal rods gradually pass over into the foot plate. This gradual transition may also be achieved according to the German Gebrauchsmuster No. 1,834,882 and according to the German Offenlegungsschrift No. 1,936,369 in that the bottom side of the customary rubber cap which is arranged over the foot plate, tapers gradually downwardly to the pedal rod. It is furthermore known in the art to mount springs at the pedal rod whose free ends are located in proximity of the edges of the foot plate.

In contradistinction thereto, deflection cheeks or end pieces secured at the foot plate are provided in the U.S. Pat. No. 2,028,073 which are intended to prevent a getting stuck of the shoe sole edge.

All the prior art constructions entail the disadvantage that changes in the pedal rod require an increased opening in the floor plate of the motor vehicle, or that the actuating pedal is made more expensive by the additional parts and by the additional manufacturing or machining steps at the actuating pedal without fully and completely attaining thereby the intended purpose as such.

It is the aim of the present invention to provide an anti-skid protective cap, especially of rubber, for the actuating pedals of a motor vehicle, which is simple and inexpensive and which reliably prevents a getting stuck of the shoe sole edge during the pedal change.

The underlying problems are solved according to the present invention in that a single deflecting tab is provided, especially with an anti-skid protective cap for the brake pedal, on the side of the anti-skid protective cap facing the gas pedal, and in that the surface of the deflecting tab is constructed so as to possess good sliding characteristics.

It is achieved thereby that the anti-skid protective cap can be manufactured by means of a simple tool and with small expenditures.

The deflecting tab arranged unilaterally, i.e., on one side enables additionally a facilitated installation or emplacement on the actuating pedal during the assembly.

Therebeyond, the deflecting tab may be of different lengths in the direction of the pedal depth. This reduces the slide surface and therewith the friction between the shoe sole edge and an eventual contact place.

In order to impart sufficient form stability to the deflecting tab, the same may be provided with reinforcing ribs on its back side.

Additionally, the deflecting tab may possess as a whole a greater hardness than the anti-skid protective cap. The surface of the deflecting tab may be constructed thereby so as to offer better sliding abilities.

However, in order to further improve the sliding ability, the surface of the deflecting tab may be provided with a lacquer cover or coating. Of course, a very elastic lacquer such as, for example, a polyurethane lacquer must be used therefor which adheres well and cannot be removed or peeled off.

Furthermore, the layers of the deflecting tab near the surface may consist of an artificially aged rubber material.

In order to bring about an artificial aging of the deflecting tab, the surface thereof may be treated with an aqueous solution of sodium hypochlorite.

The surface structure thereby changes by further polymerization in the oxygen area. The surface becomes hard and smooth. This hard and smooth surface depends from the strength of the bath, the temperature and the duration of interaction of the bath. The thickness of the layer should not exceed a few thousands of a millimeter.

Accordingly, it is an object of the present invention to provide an anti-skid protective cap for actuating pedals of a motor vehicle which avoids by simple means the aforementioned shortcomings and drawbacks encountered in the prior art.

Another object of the present invention resides in an anti-skid protective cap for actuating pedals of a motor vehicle which is simple in construction, relatively inexpensive in manufacture and highly effective for its intended purposes.

A further object of the present invention resides in anti-skid protective caps for actuating pedals of motor vehicles which reliably prevent a getting stuck of the edge of the shoe sole under the foot plate of the brake pedal.

Still a further object of the present invention resides in an anti-skid protective cap of the type described above which reliably prevents delays from changing from the gas pedal to the brake pedal.

Still another object of the present invention resides in anti-skid protective caps for actuating pedals of motor vehicles which do not require structural changes in the floor plate of the motor vehicle and eliminate the need for additional parts or additional manufacturing operations, increasing the cost thereof.

Still a further object of the present invention resides in an anti-skid protective cap of the type described above which can be made by the use of a simple tool and at relatively low cost.

These and other objects, features and advantages of the present invention will become more apparent from the following description when taken in connection with the accompanying drawing which shows, for purposes of illustration only, one embodiment in accordance with the present invention, and wherein.

Figure 1:
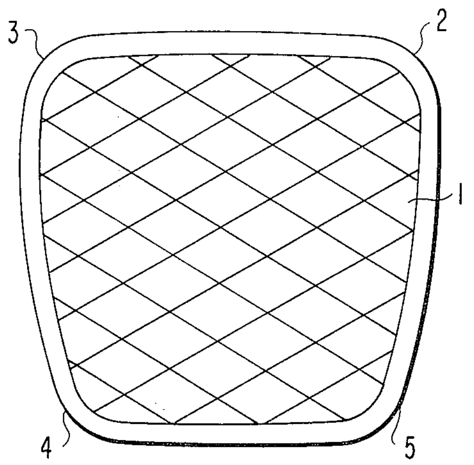
FIG. 1 is a plan view on an anti-skid protective cap in accordance with the present invention.
Figure 2:
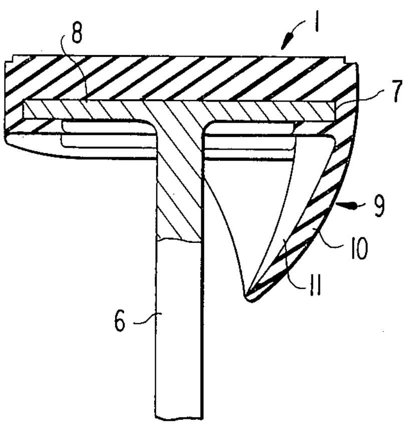
FIG. 2 is a cross-sectional view through an actuating pedal with an anti-skid protective cap slipped over the pedal.
Figure 3:
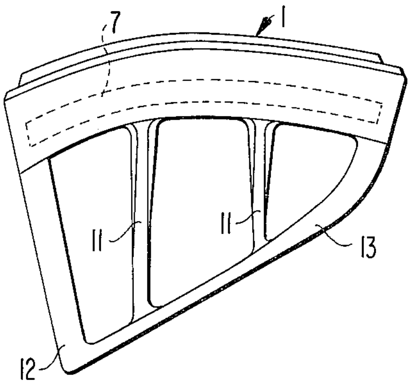
FIG. 3 is a side elevational view of the anti-skid protective cap in accordance with the present invention as illustrated in FIG. 2.

Referring now to the drawing wherein like reference numerals are used throughout the various views to designate like parts, the anti-skid protective cap illustrated in the various figures consists of a foot plate 1, which is strongly rounded-off at the corners 2, 3, 4 and 5 thereof. For purposes of better adherence at the shoe sole of the driver, the surface is provided with ornament-like raised portions and recesses. For purposes of securing at the actuating pedal 6, a ring-shaped groove 7 is provided in the anti-skid protective cap 1 which surrounds the tread surface 8 of the actuating pedal 6. On the side 9 (FIG. 2) facing the gas pedal, a deflecting tab 10 is formed integral with the protective cap, which deflecting tab 10 is curved in the direction of the actuating pedal 6. In order to impart a more stable shape to the deflecting tab 10, reinforcing ribs 11 are provided along the inside thereof.

The one side 12 of the deflecting tab 10 is longer in the downward direction of the pedal than the other side 13 which is strongly rounded-off in the direction toward the foot plate 1.

The surface of the deflecting tab 10 may as a whole have a greater hardness. This effects a better sliding ability with respect to a shoe sole edge sliding along the deflecting tab during a change of pedal.

The surface of the deflecting tab 10, however, may also be provided with a coating of a particularly elastic lacquer, such as, for example, a conventional polyurethane lacquer, or may consist of an artificially aged rubber material. The artificial aging of the surface layer of the deflecting tab 10 should only be a few thousands of a millimeter thick and is achieved in particular by treatment with an aqueous sodium hypochlorite solution.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An anti-skid protective cap for one of a plurality of actuating pedals, such as brake pedals and the like, of a motor vehicle of the type having a plurality of actuating pedals selectively actuated by the shoe of the vehicle operator; said protective cap comprising:

an upwardly facing roughened anti-skid surface portion engageable by an operator's shoe during normal in-use actuation of a pedal having said cap, means for accommodating attachment of said cap to said pedal, and a shoe deflecting sliding surface portion projecting downwardly from a side edge of said anti-skid surface portion, which side edge faces an adjacent actuating pedal, said shoe deflecting surface portion exhibiting a relatively smooth substantially uninterrupted surface extending over its entire length from the anti-skid surface portion to the bottom of the shoe deflecting surface portion and being of sufficient length so as to accommodate sliding of the vehicle operator's shoe along said shoe deflecting surface portion while preventing said shoe from getting stuck under the pedal during movement of said operator's shoe from the adjacent pedal to the pedal with said cap, said cap, including said anti-skid surface portion and said shoe deflecting portion, being formed as an integral one-piece part.

2. A protective cap according to claim 1, wherein said cap is formed of rubber-like material.

3. A protective cap according to claim 1, wherein said shoe deflecting surface portion is tapered along its bottom and is longer in the downward direction at one end of the side edge of the anti-skid surface portion than at the other opposite end of the said side edge.

4. A protective cap according to claim 1, wherein reinforcing rib means are formed in said cap on the shoe deflecting surface portion at the side thereof opposite said smooth uninterrupted surface.

5. A protective cap according to claim 1, wherein said shoe deflecting surface portion exhibits a greater material hardness than does said anti-skid surface portion.

6. A protective cap according to claim 1, wherein said smooth uninterrupted surface is provided with a lacquer coating so as to decrease its sliding resistance.

7. A protective cap according to claim 1, wherein the parts of the cap near said smooth uninterrupted surface consist of an artificially aged rubber material, whereby the surface sliding characteristics are improved.

8. A protective cap according to claim 1, wherein a shoe deflecting surface portion is provided at only one side edge of said anti-skid surface portion.

9. A protective cap according to claim 1, wherein the bottom of the shoe deflecting surface portion terminates in a tip facing downwardly.

10. A protective cap according to claim 1, wherein the shoe deflecting surface portion is curved inwardly in the downward direction away from the adjacent pedal.

11. A protective cap according to claim 10, wherein reinforcing rib means are formed in said cap on the shoe deflecting surface portion at the side thereof opposite said smooth uninterrupted surface.

12. A protective cap according to claim 1, wherein the parts of the cap near said smooth uninterrupted surface consist of rubber material, artificially aged by treatment with an aqueous solution of hypochlorite.

13. A protective cap according to claim 12, wherein said artificially aged parts extend from said smooth uninterrupted surface to a depth of only a few thousandths of a millimeter.

14. A protective cap according to claim 1, wherein said pedal is a vehicle brake pedal and said adjacent pedal is an accelerator pedal.

15. A protective cap according to claim 14, wherein said shoe deflecting surface portion is tapered along its bottom and is longer in the downward direction at one end of the side edge of the anti-skid surface portion than at the other opposite end of the said side edge.

16. A protective cap according to claim 15, wherein reinforcing rib means are formed in said cap on the shoe deflecting surface portion at the side thereof opposite said smooth uninterrupted surface.

17. A protective cap according to claim 15, wherein said shoe deflecting surface portion exhibits a greater material hardness than does said anti-skid surface portion.

18. A protective cap according to claim 17, wherein the shoe deflecting surface portion is curved inwardly in the downward direction away from the adjacent pedal.

19. A protective cap according to claim 18, wherein a shoe deflecting surface portion is provided at only one side edge of said anti-skid surface portion.

* * * * *